Jan. 6, 1953    R. F. SMITH    2,624,094
CLAY EXTRUSION MACHINE
Filed Oct. 21, 1948    4 Sheets-Sheet 2
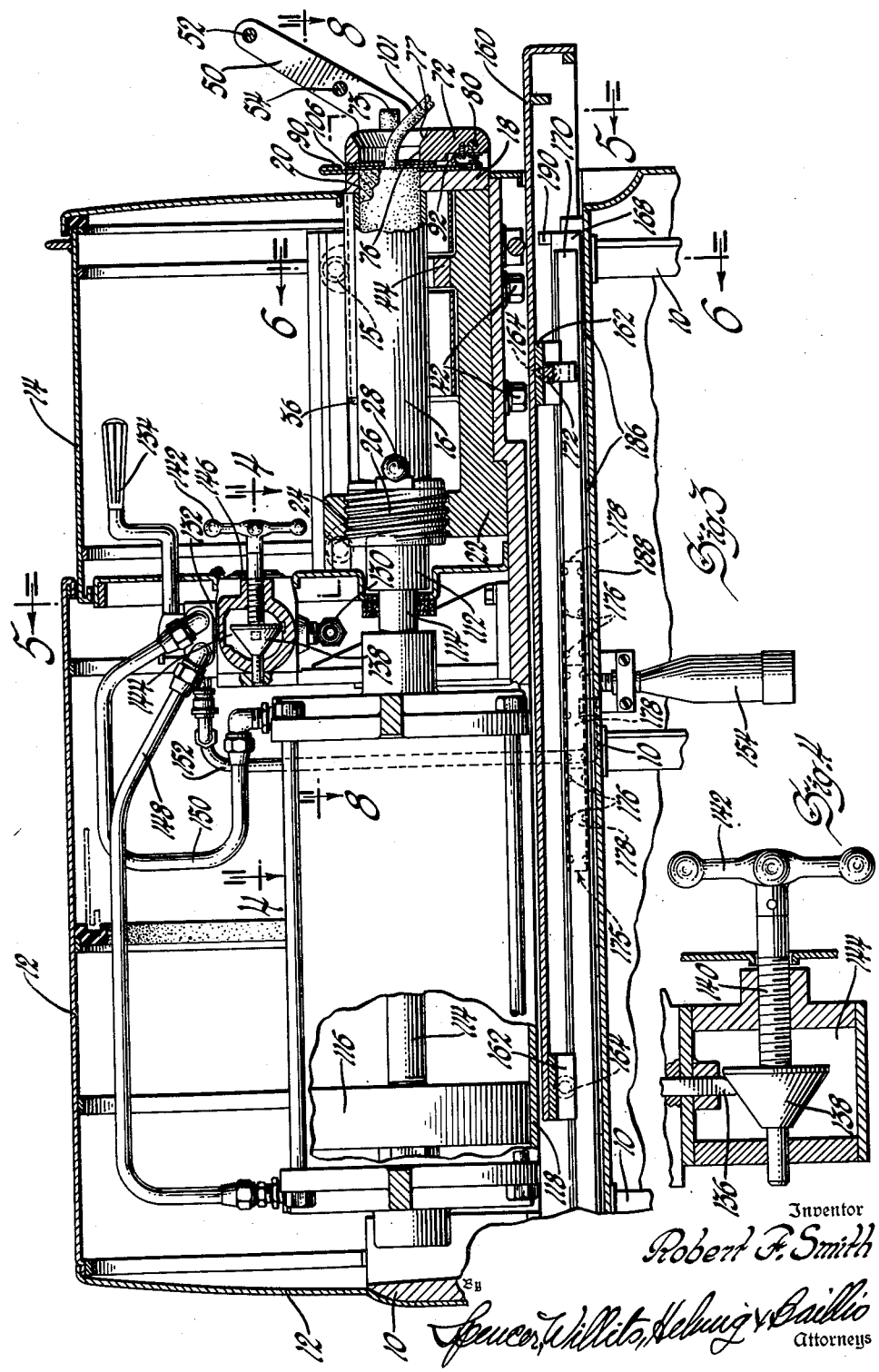
Inventor
Robert F. Smith
Spencer, Willits, Helmig & Baillio
Attorneys Jan. 6, 1953    R. F. SMITH    2,624,094
CLAY EXTRUSION MACHINE
Filed Oct. 21, 1948    4 Sheets-Sheet 3
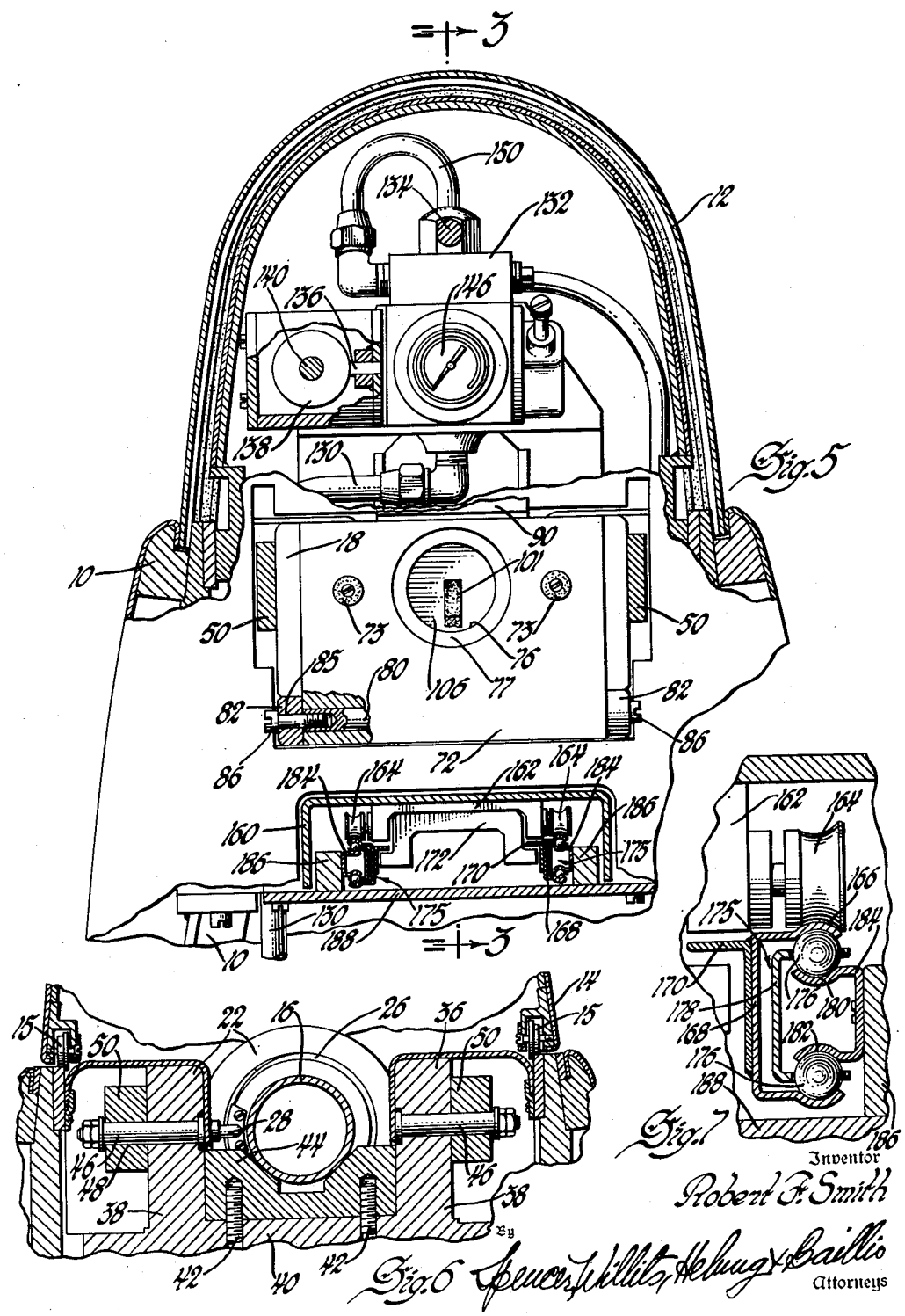
Inventor
Robert F. Smith
By Spencer, Willits, Helwig & Baillio
Attorneys Jan. 6, 1953 R. F. SMITH 2,624,094
CLAY EXTRUSION MACHINE
Filed Oct. 21, 1948 4 Sheets-Sheet 4

Inventor
Robert F. Smith
By
Spencer, Willito, Helmig & Baillio
Attorneys

Patented Jan. 6, 1953

2,624,094

UNITED STATES PATENT OFFICE 2,624,094

CLAY EXTRUSION MACHINE

Robert F. Smith, Grosse Pointe Woods, Mich., assignor to General Motors Corporation, Detroit, Mich., a corporation of Delaware Application October 21, 1948, Serial No. 55,808

11 Claims. (Cl. 25—11)

This invention has to do with a machine for extruding plastic materials and is more particularly concerned with an apparatus or machine for extruding modeling clay and similar materials.

In connection with the styling of automobiles it is common to form large or full-sized models thereof in which modeling clay is employed. Frequently in such modeling work it is desirable to provide elongated strips or moldings of modeling clay which simulate the moldings of the actual automobile. These moldings may be of innumerable cross-sectional shapes. The primary object of this invention is to provide an improved machine for extruding modeling clay or other plastic material into strips or moldings of any desired cross-sectional shape. Other objects of the invention are the following: to provide a plastic extrusion-machine in which it is easy to remove an extrusion-die and quickly replace it with another die having the same or a differently shaped extrusion orifice, to provide an improved means for clamping or locking an extrusion-die in operative position or for unclamping the die and replacing it with another, to provide a die holder whereby one or more dies may be easily located and resiliently held in desired position prior to being clamped into operative position for having plastic material extruded therethrough, to provide an extrusion-machine having improved means for permitting ready removal of an extrusion-cylinder and replacement of the same or a different cylinder, to provide an improved machine for extruding modeling clay and like plastic material having an extensible and retractible support for the extruded material, and to provide an improved extrusion-machine actuated by air or other fluid pressure having extensible and retractible means for connecting a fixed source of fluid pressure to the extrusion-machine whereby the latter may be operated in a multiplicity of positions to which it may be moved. Other objects and advantages of invention will become more apparent as the description proceeds.

Reference is herewith made to the accompanying drawings which illustrate an extrusion-machine in accordance with one embodiment of the invention.

In the drawings:

Figure 3 is a cross-sectional view taken substantially on line 3—3 in Figure 5.

Figure 4 is a sectional view of a detail on line 4—4 in Figure 3.

Figure 5 is a view taken substantially on line 5—5 in Figure 3.

Figure 6 is a sectional view taken substantially on line 6—6 in Figure 3.

Figure 7 is an enlarged sectional view showing means for extensibly mounting a table or support for extruded material.

General description

Figure 1:
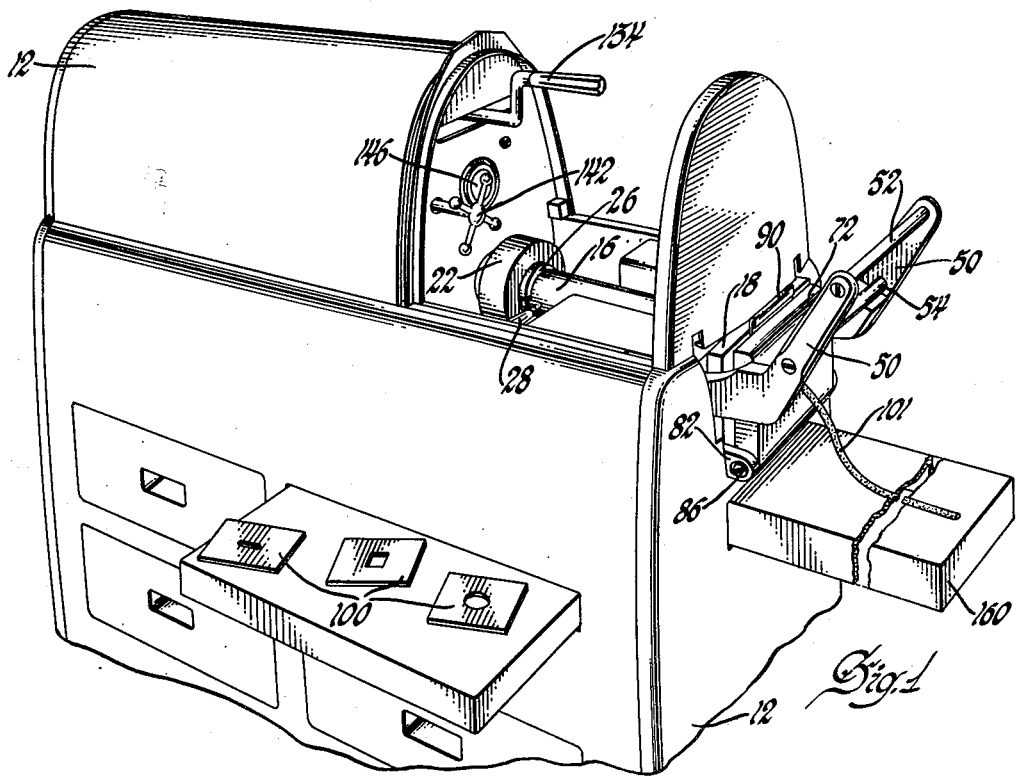
Figure 1 is a perspective view of an extrusion-apparatus with parts broken away showing a slidable cover in closed position, a support for the extruded material in extended position, and a shelf in extended position on which is shown a plurality of extrusion-dies having differently shaped extrusion-orifices.

The construction shown in the drawings includes an extrusion-cylinder for containing a supply of modeling clay or like material to be extruded. Means are provided to readily lock an extrusion-cylinder in operative position and to unlock an extrusion-cylinder so that it may be removed. In this way an extrusion-cylinder can be quickly removed, refilled with modeling clay and reinserted in the machine, or replaced by a different cylinder with modeling clay therein. Means are provided also whereby an extrusion-die can be quickly replaced with another or others and the die or dies located and held in operative position relative to the extrusion-cylinder. The extrusion-dies preferably are formed of sheet aluminum which is easily cut-out to form the shape of orifice desired for any particular molding. In this manner inexpensive dies may be used. A retractible and extensible table is provided which, when extended, may have placed thereon a removable board on which the modeling clay is extruded and which may be carried with the elongated molding strip thereon to the model being worked on. When the machine is not in use the table may be retracted so as not to project outwardly from the machine. In order that the machine may be easily moved from one place to another it is provided with casters. The modeling clay is extruded by means of a plunger actuated by a piston in an air cylinder. A flexible air hose mounted on a reel carried by the machine permits supplying air pressure to the air cylinder from a fixed air line to any position which the length of hose will permit, the reel being rotated as necessary. The machine also has a generally enclosed sheet metal casing, a slidable cover being provided which is slidable to permit access to the extrusion-cylinder and control elements of the apparatus. When the machine is not in use the slidable cover is moved to closed position.

*Detailed description*

Figure 2:
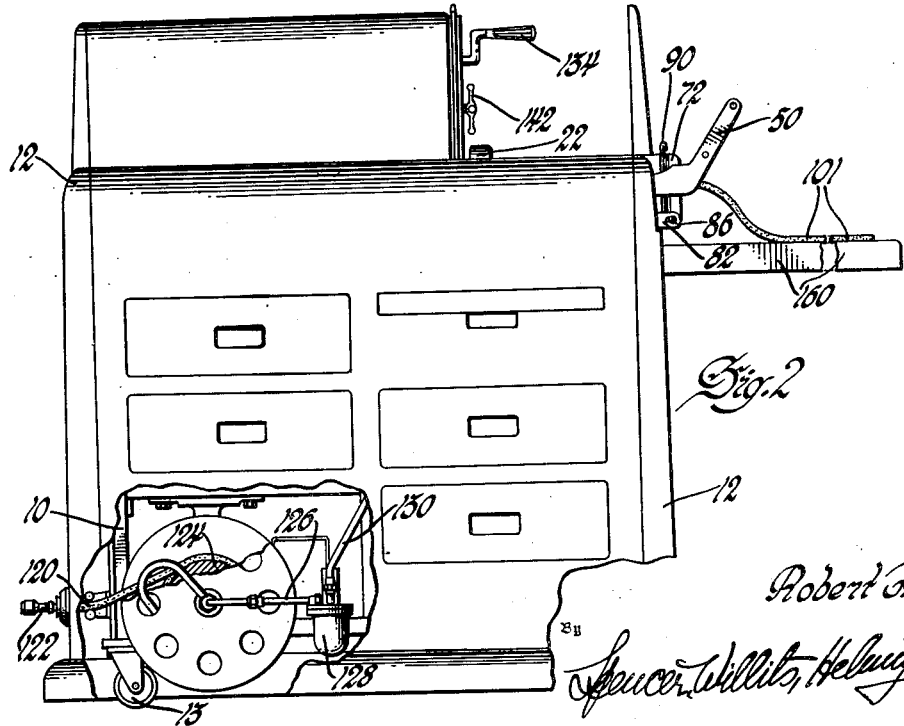
Figure 2 is a side elevational view, with parts broken away, of the apparatus of Figure 1.
Figure 8:
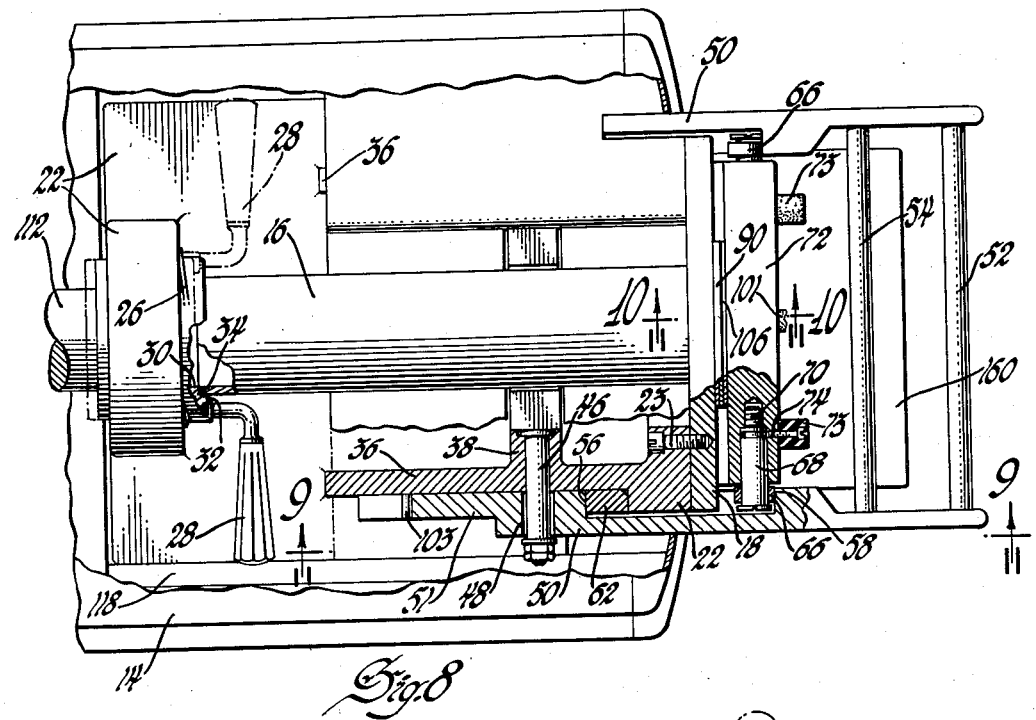
Figure 8 is a view substantially on line 8—8 in Figure 3 with parts broken away to show the construction more clearly.

Referring to the drawings the reference numeral 10 designates in its entirety the supporting frame of the machine, while 12 represents in its entirety an enclosing sheet metal casing carried by the frame. Casters 13 are provided for moving the machine from place to place as desired. A slidable cover 14 supported by rollers 15 is provided, the cover being in open position in Figures 1 and 2 and in closed position in Figure 3. Below the cover in the closed position is an extrusion-cylinder 16 adapted to contain plastic material, such as modeling clay, to be extruded. The right-hand end of extrusion-cylinder 16 contacts a plate 18 which has a circular opening 20 of the same diameter as that of the internal diameter of cylinder 16 and is in alignment therewith. The plate 18 is secured to the right-hand end of a member 22 as by means of screws 23 (Fig. 8). The left-hand end of member 22 has a screw-threaded opening 24 within which, in mating relation, is a screw-threaded member 26 having a handle 28 fixed thereto for rotating the same. The screw-threaded member 26 (see especially Figure 8) has a bore 30 of the same diameter as that of the cylinder 16 and the bore and cylinder are in alignment. The bore 30 is enlarged at the right-hand end thereof as shown at 32 so it will accommodate the left-hand end of cylinder 16, the shoulder 34 between the bores 30 and 32 contacting the left-hand end of cylinder when the machine is in operative position. Movement of the handle 28 and screw-threaded member 26 from the full line positions in Figure 8 to the dotted line positions will move the shoulder 34 to the left out of contact with the end of cylinder 16 whereby the cylinder may be removed from the machine. When a cylinder is removed, modeling clay, normally supplied as a cylindrical slug of slightly less diameter than the internal diameter of the extrusion-cylinder, may be inserted therein and the cylinder with the modeling clay replaced in the machine, or a new cylinder with a supply of modeling clay inserted. If desired, the modeling clay may be heated to make it more plastic. In the full line positions of handle 28 and screw-threaded member 26, the right hand end of cylinder 16 is forced to the right against plate 18 and securely held in fixed position.

Member 22 has a pair of upwardly extending side elements 36 which are thickened at 38. Within the thickened portions 38 and fixed to the base 40 of member 22 by screws 42 (see Fig. 6) is a V-block 44 which acts as a support for cylinder 16 and as a means for accurately locating the right-hand end of the cylinder with respect to the opening 20 in plate 18. The thickened portions 38 also have pins 46 supported thereby, the free or outer ends of which cooperate with slotted openings 48 in a pair of opposite arms 50. The right-hand ends of the arms 50 incline upwardly and are secured together by cross-rods 52 and 54, which latter also serve as handles for actuating the arms as a unit. Each arm 50 is formed with a cam surface 56 and an arcuate-shaped surface 58. Each cam surface 56 cooperates with an inclined face or edge 60 of a member 62, each member 62 being secured by screws 64 to member 22.

Figures 9, 10:
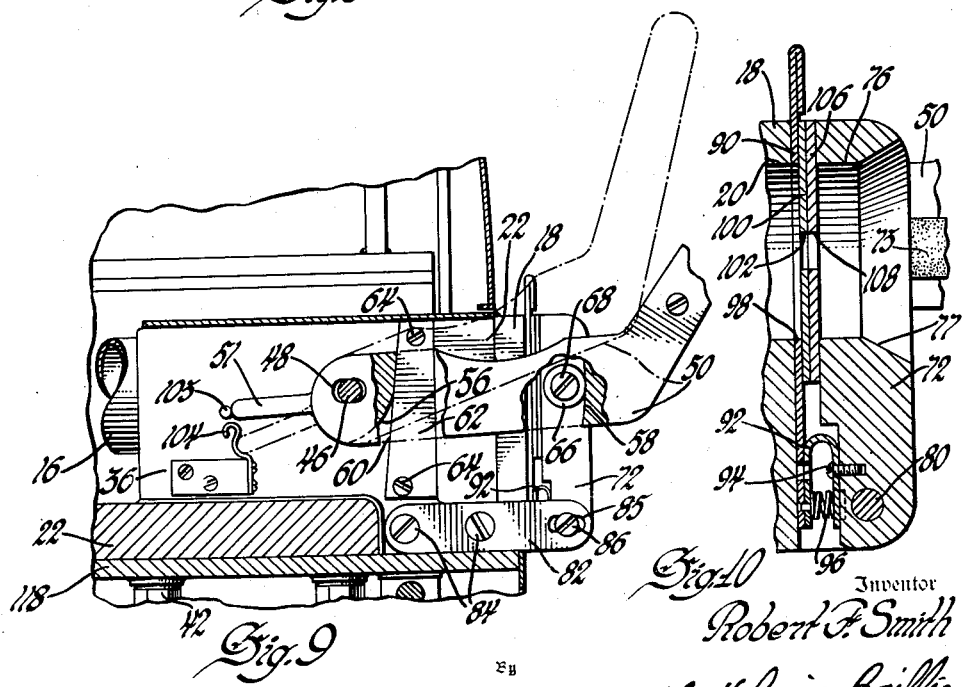
Figure 9 is a view substantially on line 9—9 in Figure 8.
Figure 10 is a sectional view on line 10—10 in Figure 8.

The arcuate-shaped surfaces 58 of the pair of arms 50 cooperate with a pair of similar rollers 66 rotatably mounted on pins 68. The inner ends of the pins are in threaded engagement at 70 (Fig. 8) with a locking-plate 72. Set screws 74 cooperate with the pins 68 to secure the same in proper position in the locking-plate 72. Bumpers 73 of rubber or similar material are provided about each set screw. The locking-plate 72 has an opening 76 in the upper half thereof, the inner portion of the opening being in alignment with and of the same diameter as the internal diameter of the cylinder 16 and the opening 20 in plate 18, while the outer portion of opening 76 is flared outwardly at 77 as best seen in Figures 8 and 10. The locking-plate 72 is hinged by means of a rod 80 extending through the same at the lower portion thereof to a pair of similar links or straps 82 secured to members 22 by means of screws 84 (screws 84 shown in drawing only in link of Figure 9). Each link 82 at its right-hand end has an elongated opening or slot 85 cooperating with an enlarged head 86 of the rod 80. The construction of the slots 85 and heads 86 is such that a loose connection is provided between these parts and the clamping plate in movable back and forth as permitted by the length of the slot.

The clamping-plate 72 is so mounted that it is spaced a small distance from the plate 18. Between these parts is a composite member consisting of a sheet metal member 90 to which is secured adjacent the lower portion thereof a resilient or spring member 92 of U-shape in cross section. The member 92 is secured by means of screws 94 to the plate 72. A helical spring 96 in the U-shaped member 92 biases the plate 72 to the right as viewed in Figures 1, 3, 8, 9 and 10. Member 90 has a circular opening 98 therein of the same diameter as and in alignment with the inner diameter of the cylinder 16, the opening 20 in plate 18 and the opening 76 in plate 72.

Between the member 90 and the plate 72 is shown an extrusion-die 100 having an opening 102 therein of the shape desired for any particular strip of modeling clay or the like. The die 100 may be made of any desired material. Sheet aluminum is a convenient material to use as it is relatively inexpensive and it is easy to form the same with an extrusion-opening of any desired shape. A backing plate 106 of sheet steel or the like is provided between the die 100 and the plate 72. Backing plate 106 has an opening 108 in alignment with the opening 102 in the extrusion die 100. The opening 108 of the backing plate may be the same shape as that of the extrusion-die or it may be of sufficient size and shape as to accommodate a multiplicity of extrusion-dies having differently-shaped orifices. If desired also, a plurality of dies having differently-shaped orifices may be employed at one time and these may be displaced relatively to one another so that the effective opening is a composite of the two separate shapes. The sheet metal plate 90 and its spring mounting applies sufficient pressure to hold the one or more dies, or die or dies and backing plate to the hinged-clamping plate 72 in any desired position relative to the longitudinal axis of the extrusion-cylinder.

When it is desired to change dies the handles 52 and 54 are raised to thereby bring the pair of arms 50 to the position shown by the broken lines in Figure 9. A deflector pin 103 fixed to each of the two side walls 36 of member 22 engages the left hand end 51 of each arm 50 to insure that the left-hand ends of the arms will contact the upper portions of spring clips 104 at such point thereon as to bias the same to the left and cause the left-hand ends of the arms 50 to be held by the spring clips, thereby holding the right-hand ends of the arms 50 in raised position. With the right-hand ends of arms 50 in elevated position, the arcuate surfaces 58 of arms 50 have cleared the rollers 66 on pins 68 whereby the upper end of locking plate 72 is free to be swung outwardly about the rod 80 as a hinge or pivot. The rubber bumpers fixed to the locking-plate prevent marring or damage to an extensible table (later described) located below the locking-plate. With the locking-plate swung outwardly the die or dies may be removed and a different die or dies inserted between the locking plate and the resiliently mounted sheet metal member 90. The locking plate 72, sheet metal member 90 and die or dies are then swung into position next to the outer face of plate 18. The outer ends of the pair of arms 50 are then moved downwardly. The arcuate surfaces 58 of the arms 50 and the rollers 66 together with the cam surfaces 56 and inclined surfaces 60 move the pair of arms 50 and the locking plate 72 slightly to the left as permitted by the loose connections provided by the slots 48 and 85, thereby tightly clamping or locking sheet metal member 90 and the die or dies and/or backing plate in fixed operative position adjacent the extrusion-cylinder.

While the locking-plate is swung outwardly as described above, a new supply of modeling clay may be inserted into an extrusion-cylinder. This is an alternative method for filling an extrusion-cylinder to that employed when the extrusion-cylinder is removed as heretofore mentioned.

For extruding the modeling clay from an extrusion-cylinder 16 there is provided a plunger 112 actuated by a piston-rod 114 connected to a piston 116 in an air cylinder 118. Air under pressure is supplied to the machine through a hose 120 having one end adapted to be connected at 122 (see Fig. 2) to a suitable source of compressed air. The hose is carried on a rotatable reel 124 so that the machine may be operated in various positions spaced from the supply of air pressure. From the reel the hose is connected by airline 126 to a unit 128 which supplies a small amount of oil to the air and then by pipe 130 to a four-way valve 132. A suitable control handle for the valve is indicated at 134. For regulating the amount of pressure supplied to the entrance side of the valve there is provided a control rod 136 movable inwardly by means of cone-shaped member 138 carried on a screw-threaded member 140 actuated by hand wheel 142. A spring (not shown) biases the control rod 136 outwardly against the member 138. The cone-shaped member and the end of the control rod 136 contacting the cone-shaped member 138 are carried in a bath of oil in compartment 144. A suitable gage 146 indicates the amount of air pressure supplied to the valve 132. A pipe 148 leads from the valve 132 to the left-hand end of the air cylinder beyond the piston therein. Another pipe 150 leads from valve 132 to the right-hand end of the air cylinder. A third pipe 152 leads from the air valve to an exhaust silencer 154. Movement of handle 134 in one direction from neutral position will permit air from line 130 to pass through passages in valve 132 and through the line 148 to the air cylinder 118 to move the piston 116 to the right as viewed in Figure 3. During this movement of the piston air is exhausted through the pipe 150, valve 132, pipe 152 and silencer 154 into the atmosphere. Movement of handle 134 in the opposite direction from neutral position will cause air under pressure from pipe 130 to pass through valve 132 and line 150 to air cylinder 118 whereby the piston 116 is moved to the left. During movement of the piston to the left air is exhausted to the atmosphere from the left-hand end of the cylinder by means of pipe 148, valve 132, pipe 152 and air silencer 154. Movement of piston 116 correspondingly moves plunger 112 in the cylinder 16 either to the right or left. Movement of plunger 112 to the right causes the modeling clay in the cylinder 16 to be extruded through the orifice in die 100 to form an elongated strip of desired cross-sectional shape. The extruded strip is indicated at 101.

The extruded material is supported by an extensible table 160, or by a removable board (not shown) carried by the table. The table has brackets 162 fixed thereto at spaced intervals. Each bracket has a pair of rollers 164 carried thereby and adapted to roll on upper arcuate surfaces 166 of a pair of slides, each of which consists of an elongated channel-shaped member 168 to which is secured, as by means of welding, an elongated member 170 of a right-angular shape in cross-section. Secured to the right-hand bracket 162 is a bracket 172, the outer ends of which are beneath the horizontal surface of angular-member 170. Each slide is slidably mounted on bearing units 175 comprising balls 176 rotatably carried by cages 178. Three bearing units are employed for each slide in the form of apparatus disclosed herein (see Fig. 3), each unit consisting of a cage and three upper and three lower balls. The balls contact arcuate portions 180 and 182 of elongated channel members 184. The channel members 184 are fixed (as by screws not shown) to a plurality of spaced blocks 186, which in turn are fixed to a plate 188, forming a portion of the supporting structure of the machine. In extending the table it is moved to the right, as best seen in Figure 3, until the rollers 164 contact stops 190 carried by the slides, whereupon both the table and slides move together. During a portion of the outward travel of the slides and table as a unit the bearings are not forced to travel with the slide and the balls may simply rotate in the stationary cages and arcuate surfaces of the slides and channel members. However at a later stage in the movement of the slides and table a stop or projection (not shown) carried by each slide engages the rearmost bearing and moves it and thereby the other two bearings to the right until the right-hand bearing of each slide engages a fixed stop (not shown) thereby preventing further travel of the slides and table. During use of the machine the table is extended as just described. When not in use it is a simple matter to move the table and slides to the left so that they do not project outwardly from the machine, thus taking up less space and presenting a more attractive appearance.

While I have shown and described a preferred embodiment of my invention, it will be apparent that various modifications and changes may be made without departing from the principles and spirit of the invention.

I claim:

1. In a machine for extruding plastic material, an extrusion cylinder, a hinged-clamping plate adjacent one end of said cylinder, means carried by the hinged-clamping plate for holding an extrusion-die for movement with the hinged-clamping plate, means for locking the hinged clamping-plate and extrusion die in fixed position adjacent said end of the cylinder, and a fluid pressure actuated plunger in said extrusion-cylinder for extruding plastic material from said cylinder through said extrusion die.

2. In a machine for extruding plastic material, an extrusion-cylinder, a hinged-clamping plate adjacent one end of said cylinder, an extrusion-die, means carried by said clamping plate for resiliently holding an extrusion-die against said clamping plate when said hinged-clamping plate is in unclamping position, means for locking said clamping-plate and extrusion-die in fixed position adjacent said end of said cylinder, and an air pressure actuated plunger in said extrusion-cylinder for extruding plastic material from said cylinder through said extrusion-die.

3. In a machine for extruding plastic material, an extrusion-cylinder, a hinged-clamping plate adjacent one end of said cylinder, means carried by said clamping plate for resiliently holding an extrusion-die in contact with said clamping plate for movement therewith, a pair of rollers carried by said clamping plate at opposite sides thereof, a pair of pivoted arms operable as a unit and having arcuate surfaces for cooperating with said pair of rollers, said arcuate surfaces on said arms in one position clearing said rollers whereby said hinged-clamping plate may be swung outward and in another position engaging the rollers and locking the clamping plate and extrusion-die in fixed position adjacent the end of said cylinder, and a fluid actuated plunger in said extrusion-cylinder for extruding plastic material through said extrusion-die.

4. In a machine for extruding plastic material; an extrusion-cylinder; a hinged-clamping plate adjacent one end of said cylinder, means carried by said clamping plate for resiliently holding an extrusion-die in position on said clamping plate; a pair of rollers carried by said clamping plate at opposite sides thereof; a pair of arms operable as a unit; said arms having arcuate surfaces for cooperating with said rollers, and also having cam surfaces and slotted openings; fixed inclined surfaces contacting said cam surfaces; fixed pins within said slotted openings for pivoting the arms and permitting a small amount of movement of the arms with respect to the pins; and a fluid pressure actuated plunger in said extrusion-cylinder for extruding plastic material through said extrusion-die.

5. In a machine for extruding plastic material, a fixed plate member having a circular opening therethrough, an extrusion cylinder having its internal diameter the same as the diameter of said circular opening, means for holding one end of said extrusion cylinder in contact with said fixed plate with the axis of the extrusion cylinder in alignment with said circular opening, a movable clamping plate on the opposite side of said fixed plate from that of said extrusion-cylinder, an extrusion-die between said clamping plate and fixed plate, means for locking the clamping-plate and extrusion-die in fixed position adjacent said fixed plate, and means for extruding plastic material from the extrusion-cylinder through said extrusion-die.

6. In a machine for extruding plastic material, a fixed plate member having a circular opening therethrough, an extrusion-cylinder having its internal diameter the same as the diameter of said circular opening and in axial alignment therewith, screw-threaded means movable to one position to engage one end of said extrusion-cylinder to move the extrusion-cylinder and hold the opposite end thereof in pressure contact with said fixed plate and movable in the opposite direction for release of said extrusion-cylinder, a hinged-clamping plate on the opposite side of said fixed plate from that of said extrusion-cylinder, means carrier by said clamping plate for resiliently holding an extrusion-die against said clamping plate when the latter is in unclamped position, means for locking said clamping plate in fixed position with the resilient die holding means in contact with said fixed plate and with the die between the resilient means and said clamping plate, and an air pressure operated plunger in said extrusion-cylinder for extruding plastic material from said cylinder through said extrusion-die.

7. In a machine for extruding plastic material such as modeling clay and the like, an extrusion-cylinder, a clamping plate adjacent one end of said cylinder, a pair of fixed strap-members having slots adjacent the outer ends thereof, a rod passing through said clamping plate near the bottom thereof and having end portions within the slotted openings whereby the rods are pivotally movable within the slots at any point permitted by the length of the slots, spring means carried by said clamping plate for resiliently holding extruding-dies to said clamping plate, a pair of rollers carried at opposite sides of said clamping plate, a pair of spaced arms operable as a unit, said arms having arcuate surfaces for cooperating with said rollers, said arms also having cam surfaces and slotted openings, fixed inclined surfaces contacting said cam surfaces and fixed pins within said slotted openings for pivoting the arms, said slots permitting a small amount of movement of the arms relatively to the pins, the construction being such that in one position of the arms the pair of rollers are engaged by said arcuate surfaces and the clamping plate held in locked position and in another position of the arms the arcuate surfaces clear the rollers whereby the locking plate is movable outward and downward.

8. In a machine for extruding plastic material, an extrusion-cylinder, a movable clamping plate adjacent one end of said cylinder, an extrusion-die between the said end of said extrusion-cylinder and said clamping plate, means for locking the clamping plate and extrusion-die in fixed position adjacent said one end of said extrusion-cylinder, a plunger in said extrusion-cylinder for extruding plastic-material from said extrusion-cylinder through said extrusion-die, an air cylinder, a piston therein connected to said plunger in the extrusion-cylinder, and means for supplying air pressure to said air cylinder for operating the piston including a flexible hose carried by a rotatable reel supported by the machine whereby the machine may be operated at variable distances from a fixed source of air pressure.

9. A machine as in claim 1 in which the machine is supported by casters whereby it may be moved readily from place to place at variable distances from a fixed source of fluid pressure and means for supplying fluid pressure to actuate the plunger including a flexible hose carried by a rotatable reel supported by the machine whereby the machine may be operated at variable distances from the fixed source of fluid pressure.

10. A machine as in claim 1 which has supporting means carried by the machine below the extrusion-cylinder and an extensible and retractible table supported by said supporting means, which table, when extended provides a support for extruded material and which may be retracted when the machine is not in use into a position below the extrusion-cylinder and generally within an enclosing sheet metal casing carried by the supporting frame of the machine.

11. A machine as in claim 8 which has supporting means carried by the machine below the extrusion-cylinder and an extensible and retractible table supported by said supporting means, which table, when extended, provides a support for extruded material and which may be retracted when the machine is not in use into a position below the extrusion-cylinder and generally within an enclosing sheet metal casing carried by the supporting frame of the machine.

ROBERT F. SMITH.

REFERENCES CITED

The following references are of record in the file of this patent:

UNITED STATES PATENTS

| Number | Name | Date |
|---|---|---|
| 873,559 | Koontz | Dec. 10, 1907 |
| 1,252,821 | Lewis | Jan. 8, 1918 |
| 1,490,162 | Dow | Apr. 15, 1924 |
| 1,561,612 | Loichot | Nov. 17, 1925 |
| 1,600,552 | Makowski | Sept. 21, 1926 |
| 1,610,952 | Koberling | Dec. 14, 1926 |
| 1,825,475 | Pfeiffer | Sept. 29, 1931 |
| 1,858,956 | Hepperle | May 17, 1932 |
| 1,947,202 | Homeier | Feb. 13, 1934 |

FOREIGN PATENTS

| Number | Country | Date |
|---|---|---|
| 1,935 | Great Britain | Jan. 27, 1903 |